United States Patent

Makino et al.

[11] Patent Number: 5,902,674
[45] Date of Patent: May 11, 1999

[54] OLEFINE THERMOPLASTIC ELASTOMER SHEET

[75] Inventors: Makoto Makino, Sodegaura; Tatsuo Hamanaka, Ichihara, both of Japan

[73] Assignee: Sumitomo Chemical Company, Limited, Osaka, Japan

[21] Appl. No.: 08/852,075

[22] Filed: May 6, 1997

Related U.S. Application Data

[63] Continuation-in-part of application No. 08/722,496, Sep. 27, 1996, abandoned.

Foreign Application Priority Data

Sep. 27, 1995 [JP] Japan .................................. 7-249442

[51] Int. Cl.$^6$ ........................................................ B32B 3/26
[52] U.S. Cl. ...................... 428/318.6; 428/319.7; 428/319.9
[58] Field of Search .............................. 428/318.6, 319.7, 428/319.9

[56] References Cited

FOREIGN PATENT DOCUMENTS

| | | |
|---|---|---|
| 0320119 | 6/1989 | European Pat. Off. . |
| 0338860 | 10/1989 | European Pat. Off. . |
| 0452132 | 10/1991 | European Pat. Off. . |
| 0564267 | 6/1993 | European Pat. Off. . |
| 1590240 | 5/1981 | United Kingdom . |

Primary Examiner—James J. Bell
Attorney, Agent, or Firm—Birch, Stewart, Kolasch & Birch, LLP

[57] ABSTRACT

A sheet including an olefin thermoplastic elastomer obtainable by dynamically heat-treating 100 parts by weight of a mixture of 40–90% by weight of (A) an olefin polymer rubber having a Mooney viscosity at 100° C. ($ML_{1+4}100°$ C.) of 5–100 and substantially free from unconjugated diene and 60–10% by weight of (B) an olefin polymer in the presence of 0.005–0.5 part by weight of an organic peroxide and 0.05–4 parts by weight of N,N'-m-phenylenebismaleimide or divinylbenzene. Said sheet is excellent in light resistance and thermal aging resistance. A laminate including said sheet and a use thereof are also provided.

6 Claims, No Drawings

OLEFINE THERMOPLASTIC ELASTOMER SHEET

This application is a continuation-in-part of application Ser. No. 08/722,496 filed on Sep. 27, 1996, now abandoned, the entire contents of which are hereby incorporated by reference.

BACKGROUND OF THE INVENTION

1. Field of the Invention

The present invention relates to a sheet comprising an olefin thermoplastic elastomer having excellent light resistance and thermal aging resistance, a laminate comprising said sheet and a use thereof. More precisely, the invention relates to a sheet comprising an olefin thermoplastic elastomer having excellent duration properties, particularly light resistance or the like, which is excellent in external appearance and touch or the like and which may be substituted for plasticized polyvinyl chloride material; a laminate constituting said sheet; and an internal finish material for automobile constituting said sheet or laminate.

2. Background Information

Thermoplastic elastomers have found wide application in industrial products including automobile parts, electric appliance parts and sundry goods since the time consuming vulcanization step is not required in the productions of them and they can be processed using a conventional molding machine for a thermoplastic resin.

On the other hand, moldings of improved quality have hitherto been known which were produced by laminating a skin material onto a molded thermoplastic resin to impart improved external appearance and soft touch. As the skin material, for example, a plasticized polyvinyl chloride material lined with a foamed layer of polyolefin or polyurethane in order to impart cushioning properties has been used.

The polyvinyl chloride skin material, however, has the problem that it has a large specific gravity and an inferior light resistance. Therefore its surface appearance is significantly deteriorated when used as a skin material for an automobile part which is exposed to direct sun light. In addition, since it is plasticized by containing a large amount of plasticizer, it has a problem in that the windshield and the like become fogged up due to the plasticizer when used as an internal finish skin material for automobile.

Furthermore, since polyvinyl chloride generates hydrogen chloride gas upon combustion due to its chemical structure, it has the added problems in that its incineration after use should not be permitted from an environmental viewpoint, and that it tends to erode various processing apparatuses.

In order to solve the above described problems, it was proposed to produce a skin material by using an olefin thermoplastic elastomer comprising ethylene-α-olefin-unconjugated diene copolymer rubber as the rubber component (JP-A-4-73112).

However when ethylidenenorbornene was used as the unconjugated diene, the properties of the product deteriorated within a short period upon exposure to light.

When dicyclopentadiene is used as the unconjugated diene, deterioration of the properties within a short period is less significant (JP-A-5-279524), but there is still the problem that the thermal aging resistance of the product was not sufficient. Therefore, when a thermoplastic elastomer sheet containing one of these unconjugated dienes is applied for a use in which light resistance is particularly required, such as a skin material for the instrument panel of automobile, a large amount of light stabilizer must be used in order to prevent light aging. As the result, problems arose because the sheet became dirty due to the light stabilizer deposited on the surface of the sheet or the windshield was fogged up by sublimed light stabilizer.

The object of the present invention, therefore, is to solve these problems of the conventional art and to provide a sheet comprising an olefin thermoplastic elastomer having excellent light resistant and heat resistant properties, a laminate comprising said sheet and an internal finish material for an automobile comprising said sheet or laminate.

After extensive research toward solving these problems, the present inventors have found that the light deterioration and the heat deterioration are less significant when an olefin thermoplastic elastomer is produced using an olefin polymer rubber free from unconjugated diene and using particular amounts of a specific cross-linking agent and a specific cross-linking aid. The present invention has been completed on the basis of such findings and further improvement.

SUMMARY OF THE INVENTION

The present invention provides a sheet comprising an olefine thermoplastic elastomer obtainable by dynamically heat-treating 100 parts by weight of a mixture of 40–90% by weight of (A) an olefin polymer rubber having a Mooney viscosity at 100° C. ($ML_{1+4}100°$ C.) of 5–100 and substantially free from unconjugated diene and 60–10% by weight of (B) an olefine polymer in the presence of 0.005–0.5 part by weight of an organic peroxide and 0.05–4 parts by weight of N,N'-m-phenylenebismaleimide or divinylbenzene or of a mixture thereof. The preferred thickness of the sheet is between 0.1–5 mm, more preferably between 0.2–2 mm.

Further, the present invention provides a laminate comprising an olefin thermoplastic sheet according to the invention and a foam or a foamed sheet of a material laminated thereon. The laminate may be obtained by laminating a foam or a foamed sheet of a material such as polyethylene, polypropylene and polyurethane onto said olefine thermoplastic elastomer sheet.

Still further, the present invention provides an internal finish material for an automobile comprising said sheet or laminate.

DETAILED DESCRIPTION OF THE INVENTION

The present invention is described in more detail.

First, the olefin thermoplastic elastomer sheet of the present invention is described below.

The olefine polymer rubber (A) used in the present invention is an olefine polymer rubber having a Mooney viscosity at 100° C. ($ML_{1+4}100°$ C.) of 5–100, preferably of 10–70, and substantially free from unconjugated diene.

If the Mooney viscosity at 100° C. ($ML_{1+4}100°$ C.) is lower than 5, the favorable mechanical properties cannot be obtained and if it is higher than 100, the external appearance of the molded product is inferior. Therefore, these are not preferred.

The olefin polymer rubber (A) used in the present invention includes, for example, amorphous random elastic copolymers containing an olefin as the main component selected from ethylene-propylene copolymer rubber, ethylene-1-butene copolymer rubber and propylene-1-butene copolymer rubber. The amorphous random elastic copolymers preferably contain the olefin in an amount of at least 50% by weight. Among them, ethylene-propylene copolymer rubber (hereinafter, referred to as "EPM") is preferred and ethylene-propylene copolymer rubber having a propylene content of 10–40% by weight, particularly of 20–35% by weight, is more preferred.

A preferred olefin polymer (B) used in the present invention is polypropylene or a copolymer of propylene and an α-olefin other than propylene. The α-olefine other than propylene includes, for example, ethylene, 1-butene, 1-pentene, 3-methyl-1-butene, 1-hexene, 1-decene, 3-methyl-1-pentene, 4-methyl-1-pentene and 1-octene. The polymer has a melt flow rate within a range usually of 0.1–100 g/10 minutes and preferably of 0.5–50 g/10 minutes.

The olefin thermoplastic elastomer used in the present invention can be obtained by dynamically heat-treating a mixture comprising (A) an olefin polymer rubber and (B) an olefin polymer in the presence of an organic peroxide as the specific cross-linking agent and a specific cross-linking aid.

The organic peroxide includes, for example, 2,5-dimethyl-2,5-di(t-butylperoxy)hexane, 2,5-dimethyl-2,5-di(t-butylperoxy)hexyne-3, 1,3-bis(t-butylperoxyisopropyl)benzene, 1,1-di(t-butylperoxy)-3,3,5-trimethylcyclohexane, 2,5-dimethyl-2,5-di(peroxybenzoyl)hexyne-3 and dicumylperoxide. Among them, 2,5-dimethyl-2,5-di(t-butylperoxy)hexane or 2,5-dimethyl-2,5-di(t-butylperoxy)hexyne-3 is particularly preferred from the viewpoint of odor and scorching properties.

The amount of the organic peroxide may be selected within a range of 0.005–0.5 part by weight, preferably of 0.01–0.1 part by weight, per 100 parts by weight of the total amount of the olefin polymer rubber (A) and the olefin polymer (B).

The amount of the organic peroxide less than 0.005 part by weight is not preferred because cross-linking becomes uneven. When the amount is more than 0.5 part by weight, the strength of the sheet decreases.

During the production of the olefin thermoplastic elastomer of the invention, a specific cross-linking aid is added in a specific amount, in addition to said organic peroxide.

The specific cross-linking aid is N,N'-m-phenylenebismaleimide or divinylbenzene.

By using such a compound, an even and moderate cross-linking reaction occurs and improvement of mechanical properties can be attained even for the olefin polymer rubber substantially free from unconjugated diene.

The amount of the cross-linking aid is within a range of 0.05–4 parts by weight, preferably of 0.1–2 parts by weight, per 100 parts by weight of the total amount of the olefin polymer rubber (A) and the olefin polymer (B).

If the amount of the cross-linking aid is less than 0.05 part by weight, postforming such as vacuum forming is not properly performed and if the amount is more than 4 parts by weight, the flowability decreases interfering with mold-processing.

The olefin thermoplastic elastomer used in the present invention may be of a partially cross-linked type or of a completely cross-linked type, but preferably of the partially cross-linked type.

The olefin thermoplastic elastomer of the present invention can be obtained by dynamically heat-treating a mixture comprising 40–90 parts by weight, preferably 60–80 parts by weight, of (A) an olefin polymer rubber and 60–10 parts by weight, preferably 40–20 parts by weight of (B) an olefin polymer (the amounts are selected such that the sum (A)+(B) is 100 parts by weight) in the presence of an organic peroxide and the above-mentioned specific cross-linking aid.

When the amount of (A) olefin polymer rubber is less than 40 parts by weight, a flexible olefin thermoplastic elastomer can not be obtain, and an amount exceeding 90 parts by weight is not preferred because the flowability is decreased interfering with the processing into a sheet.

The method for producing a sheet from the thermoplastic elastomer described above is not particularly limited and includes, for example, a method in which the thermoplastic elastomer is extruded from an extruder at about 150–250° C. using a T-die method and a method in which the elastomer is subjected to calendering for forming a sheet at a temperature within the same range.

The laminate comprising the sheet of the present invention and usage thereof are illustrated below.

The laminate of the present invention is a laminate comprising the above described sheet and a foam or a foamed sheet of a material laminated thereon. As the material, polyethylene, polypropylene polyethylene, polypropylene and polyurethane.

The method for producing the laminate of the present invention is not particularly limited and includes, for example, a method in which a molten sheet under sheet-molding is put together with a foam or a foamed sheet of a material such as from polyethylene, polypropylene and polyurethane in layers and they are passed through the gap between a pair of rolls. In this method, the thermoplastic elastomer sheet is preferably contacted with an embossing roll and the foam or foamed sheet is preferably contacted with an ordinary roll which is not heated.

If necessary, an olefin resin may be compounded to the olefine thermoplastic elastomer which was obtained as described above. The amount to be compounded is in a range which does not deteriorate the flexibility of the olefine thermoplastic elastomer and is preferably less than 50% by weight. The olefin resin is not particularly limited and includes, for example, polyethylene and polypropylene. Among them, low density polyethylene is preferred.

Examples of final products using the olefin thermoplastic elastomer sheet or the laminate comprising said sheet include internal finish materials for automobile parts listed below.

Examples of the internal finish materials include finish materials, such as a instrument panel, console box, armrest, headrest, door trim, rear panel, pillar trim, sun visor, trunk room trim, trunk lid trim, air-bag box, seat buckle, glove compartment, steering wheel cover and ceiling material.

Examples of other usage for the olefin thermoplastic elastomer sheet or the laminate comprising said sheet of the present invention include parts for home electric appliances and office appliances, parts for building and home and parts for other industrial uses in which light resistance and heat resistance are required, as listed below.

As regards the parts for home electric appliances and office appliances, suitable uses include, for example, materials for a television set, video player, washer, drier, vacuum cleaner, cooler, air conditioner, remote controller case, electronic range, toaster, coffee-maker, pot, jar, dishwasher, personal computer, typewriter, projector, telephone, copying machine, telecopier, teleprinter and other home and office articles for which light resistance and heat resistance are required.

As regards the parts for building and home, suitable uses include, for example, materials for furnishings, a desk, chair, wall ornaments, ceiling ornaments, curtain-wall and the like, indoor flooring for kitchen, lavatory, toilet and the like, outdoor flooring for veranda, terrace, balcony, carport and the like, carpet-like cloths such as a doormat, tablecloth, coaster and ash tray cloth.

As regards the parts for other industrial uses, suitable uses include, for example, handle for electric tools.

Further suitable uses includes, for example, materials for a bag, case, file, notebook, album, stationery, camera body, puppet and other toys and materials for picture frames.

The olefin thermoplastic elastomer used in the present invention may include, if required, additives such as filler, lubricant, antioxidant, ultraviolet absorbent and light resisting agent.

EXAMPLES

The present invention will now be illustrated by means of Examples, which should not be construed as a limitation upon the scope of the invention.

Methods of testing used for measuring properties in Examples and Comparative Examples are illustrated below.

(1) Mooney viscosity at 100° C. ($ML_{1+4}$100° C.)

Measurement was carried out according to ASTM D927-57T. For oil extended ethylene-propylene-ethylidenenorbornene copolymer rubber (herein after referred to as EPDM) used in Comparative examples, the value was calculated by the following equation:

$$\log (ML_1/ML_2) = 0.0066(\Delta PHR)$$

$ML_1$: Mooney viscosity of EPDM
$ML_2$: Mooney viscosity of oil extended EPDM
$\Delta PHR$: Amount of oil extension per 100 parts by weight of EPDM (2) Melt Flow Rate (MFR)

Measurement was carried out according to JIS K-7210 at 230° C. and 10 kg.

(3) Elongation at Tensile Break and Ratio of Retention of Elongation at Tensile Break Elongation at tensile break was measured according to JIS K-6301 using JIS No. 3 dumb-bell test specimen at a rate of elongation of 200 mm/minute.

Ratio of retention of elongation at tensile break was calculated by the following equation:

Ratio of Retention of Elongation at Tensile Break (%)=(Elongation at Tensile Break after test of light or heat resistance)/ (Elongation at Tensile Break before the test)

Example 1

Using a Banbury mixer, 70 parts by weight of ethylene-propylene copolymer rubber [EPM-1, propylene content= 22% by weight, $ML_{1+4}$100° C.=35], 30 parts by weight of polypropylene (MFR=2.0 g/10 minutes, homotype), 0.4 part by weight of N,N'-m-phenylenebis-maleimide (Sumifine BM, manufactured by Sumitomo Chemical Co., Ltd.) as the cross-linking aid, 0.2 part by weight of Sumisorb 300 (manufactured by Sumitomo Chemical Co., Ltd.), 0.2 part by weight of Sanol LS-700 (manufactured by Sankyo Ltd.), 0.1 part by weight of Tinuvin 622 (manufactured by Ciba-Geigy Corp.) as the light stabilizers, and 0.1 part by weight of Irganox 1010 as the heat stabilizer were kneaded at 170–200° C. for 7 minutes. Then, they were molded with an extruder to produce a master batch in pellet form. 100 Parts by weight of the master batch was uniformly blended with 0.04 part by weight of 2,5-dimethyl-2,5-di(t-butyl-peroxy) hexane in a Henschel mixer for 3 minutes.

The blend was dynamically heat-treated in a twin-screw kneading extruder (TEX-44HC, manufactured by Nippon Seikosho Co.) at 240–260° C. for about 30 seconds to yield pellets of partially cross-linked thermoplastic elastomer.

Then, said thermoplastic elastomer was molded into a sheet using an extruding sheeting machine with a 25 mm φ T-die. A specimen was punched out from the sheet thus obtained with a JIS No. 3 dumb-bell and subjected to light test with a Sunshine Weather-O-Meter (S.W.O.M.) (manufactured by Suga Test Instruments Co. Ltd.) under conditions including a black panel temperature of 83° C. without water and the light resistance was evaluated by the ratio of retention of elongation at tensile break upon elapse of prescribed time. The results of evaluation are shown in Table 1.

Comparative Example 1

Production of oil extended EPDM-1

To a 5% (by weight) solution of ethylene-propylene-ethylidenenorbornene (ENB) copolymer rubber [EPDM-1, iodine value=12, propylene content=28% by weight, $ML_{1+4}$100° C.=242] in hexane was added 100 parts by weight of mineral oil (Diana process oil PW-380, manufactured by Idemitsu Kosan Co.) per 100 parts by weight of EPDM-1. Then the solvent was removed by steam-stripping to give oil extended EPDM-1 ($ML_{1+4}$100° C.=53).

The procedure in Example 1 was repeated except that EPM-1 was replaced by the above obtained oil extended EPDM-1. The results of evaluation are shown in Table 1.

Example 2

The procedure in Example 1 was repeated except that the amounts of Sumisorb 300 as the light stabilizer and Irganox 1010 as the heat stabilizer were changed to 0.05 part by weight and 0.05 part by weight, respectively, and Sanol LS-770 and Tinuvin 622 were not added, and the light resistance test was substituted by heat aging resistance test at the ratio of retention of elongation at tensile break with a gear oven GPH-200 (manufactured by Tabai Espec Corp.) measured at 140° C. for 500 hours. The results of evaluation are shown in Table 2.

Comparative Example 2

Production of oil extended EPDM-2

To a 5% (by weight) solution of ethylene-propylene-ethylidenenorbornene copolymer rubber [EPDM-2, iodine value=5.5, propylene content=28% by weight, $ML_{1+4}$100° C.=242] in hexane was added 100 parts by weight of mineral oil (Diana process oil PW-380, manufactured by Idemitu Kosan Co.) per 100 parts by weight of EPDM-2. Then the solvent was removed by steam-stripping to give oil extended EPDM-2 ($ML_{1+4}$100° C.=53).

The procedure in Example 2 was repeated except that EPM-1 was replaced by the above obtained oil extended EPDM-2. The results of evaluation are shown in Table 2.

Example 3

Joitac AD-471B (manufactured by Tokushushikiryo Kogyo Co.) was applied on a side of the T-die extruded sheet produced in Example 2 for adhesion with urethane. A semi-rigid cellular urethane foam, having a density of 0.16 g/cm³, formed from a 1:2 mixture of an isocyanate and a polyol manufactured by Sumitomo Bayer Urethane Co. was applied to obtain a laminate. A specimen was punched out from the laminate with a JIS No. 3 dumb-bell and subjected to light test with a Sunshine Weather-O-Meter (S.W.O.M.)

manufactured by Suga Test Instruments Co. Ltd. under conditions including a black panel temperature of 83° C. without water and the light resistance was evaluated by the ratio of retention of elongation at tensile break after removing the urethane foam upon elapse of prescribed time. The results of evaluation are shown in Table 3.

Comparative Example 3

The procedure in Example 3 was repeated except that T-die extrusion sheet was produced using 70 parts by weight of the same oil extended EPDM-1 as that used in Comparative Example 1 in place of EPM-1 in Example 2 to obtain a laminate. The results of evaluation are shown in Table 3.

TABLE 1

|  |  | Ratio of Retention of Elongation at Tensile Break (%) | |
|---|---|---|---|
|  |  | Example 1 | Comparative Example 1 |
| Time of Irradiation by S.W.O.M. (hr) | 0 | 100 | 100 |
|  | 100 | — | 66 |
|  | 250 | — | 57 |
|  | 500 | — | 45 |
|  | 600 | 98 | — |
|  | 1020 | — | 35 |
|  | 1200 | 92 | — |

TABLE 2

|  |  | Ratio of Retention of Elongation at Tensile Break (%) | |
|---|---|---|---|
|  |  | Example 2 | Comparative Example 2 |
| Time Elapsed in Gear Oven (hr) | 0 | 100 | 100 |
|  | 500 | 85 | Unable to evaluate* |

Note:
*completely degraded

TABLE 3

|  |  | Rate of Retention of Elongation at Tensile Break (%) | |
|---|---|---|---|
|  |  | Example 1 | Comparative Example 1 |
| Time of Irradiation by S.W.O.M. (hr) | 0 | 100 | 100 |
|  | 100 | 94 | 10 |
|  | 250 | 90 | Unable to evaluate* |
|  | 500 | 42 | — |

Note:
*completely degraded

As described above, an olefine thermoplastic elastomer sheet having excellent light resistance and thermal aging resistance, a laminate comprising said sheet and a use thereof are providing according to the present invention.

What is claimed is:

1. A laminate comprising a sheet of an olefin thermoplastic elastomer obtainable by dynamically heat-treating 100 parts by weight of a mixture of 40–90% by weight of (A) an olefin polymer rubber having a Mooney viscosity of 100° C. ($ML_{1+4}$100° C.) of 5–100 and free from unconjugated diene and 60–10% by weight of (B) an olefin polymer in the presence of 0.005–0.5 part by weight of an organic peroxide and 0.05–4 parts by weight of N,N'-m-phenylenebismaleimide or divinylbenzene; and a foam or a foamed sheet of a material selected from the group consisting of polyethylene, polypropylene and polyurethane laminated thereon.

2. A laminate according to claim 1, wherein the an olefin polymer rubber is a member selected from the group consisting of ethylene-propylene copolymer rubber, ethylene-1-butene copolymer rubber and propylene-1-butene copolymer rubber.

3. An internal finish material for an automobile comprising a laminate according to claim 1.

4. The laminate according to claim 1, wherein the thickness of said sheet is from 0.1 to 5 mm.

5. The laminate according to claim 1, wherein the thickness of said sheet is from 0.2 to 2 mm.

6. A laminate according to claim 1, in which the organic peroxide is 2,5-dimethyl-2,5-di (t-butylperoxy)hexane or 2,5-dimethyl-2,5-di (t-butylperoxy)hexyne-3.

* * * * *